Figure 3:
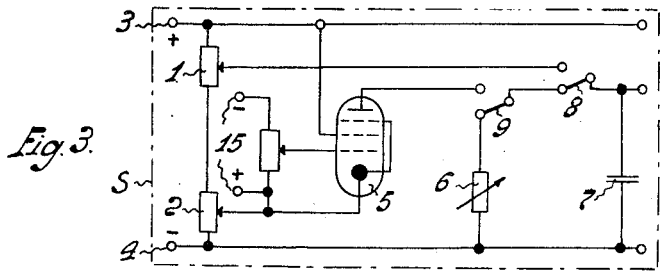

Sept. 3, 1957  G. SPIESS  2,804,943
DEVICE ON ELEVATORS FOR STOPPING EXACTLY AT FLOOR LEVEL
Filed May 17, 1955  2 Sheets-Sheet 1
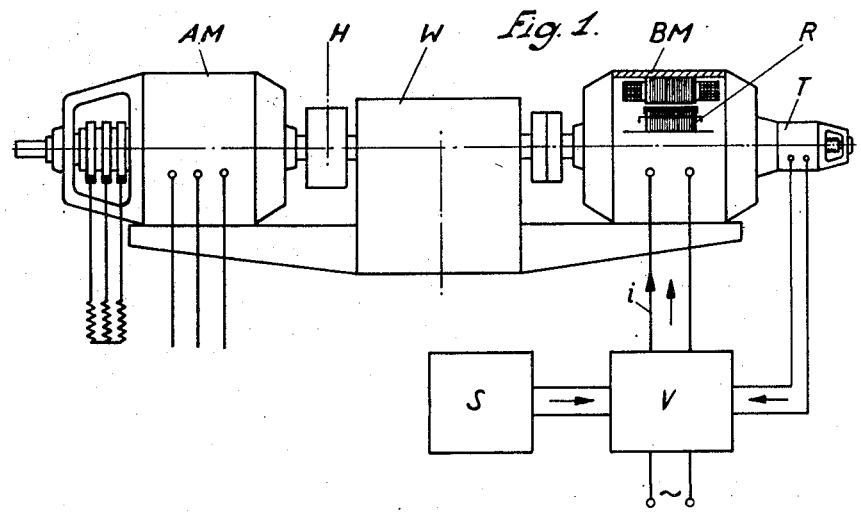
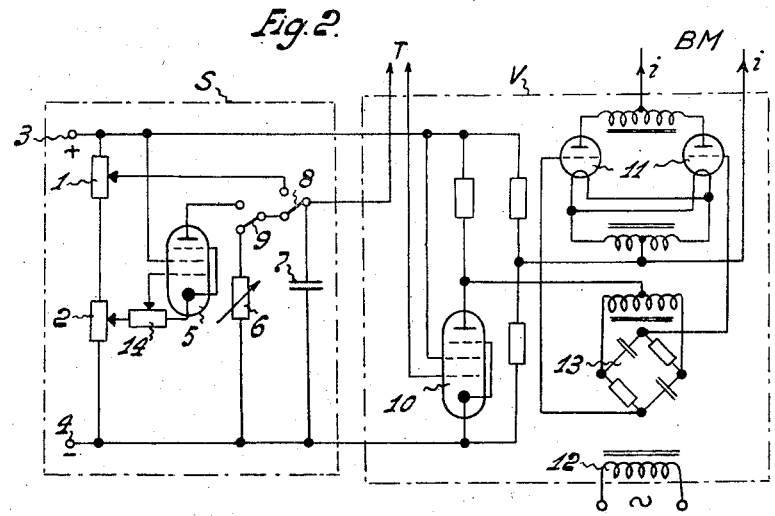

Sept. 3, 1957 G. SPIESS 2,804,943
DEVICE ON ELEVATORS FOR STOPPING EXACTLY AT FLOOR LEVEL
Filed May 17, 1955 2 Sheets-Sheet 2

United States Patent Office 2,804,943
Patented Sept. 3, 1957

2,804,943

DEVICE ON ELEVATORS FOR STOPPING EXACTLY AT FLOOR LEVEL

Gustav Spiess, Lucerne, Switzerland, assignor to Inventio Aktiengesellschaft, Hergiswil, Switzerland, a Swiss firm Application May 17, 1955, Serial No. 509,055

Claims priority, application Switzerland May 24, 1954

6 Claims. (Cl. 187—29)

The accuracy of stopping of elevators is in the majority of cases obtained by reducing the speed to a certain amount by means of a mechanical brake and then moving at that speed until floor level is reached.

The purpose of the present invention is to create a device which obtains accuracy of stopping by regulating the speed of the elevator, until it comes to rest, in dependence on the distance or the time, or on a combination of both, the brake being applied only after the elevator has come to rest.

The device according to the invention has a rotor which is coupled to the hoisting motor and rotates in a magnetic field excited by a current that depends on the difference between the voltages of a tachometer dynamo and on a nominal value of an appliance. The tachometer dynamo is coupled to the hoisting motor, and its voltage is proportional to the speed of rotation of the latter.

In Fig. 1 of the accompanying drawing one example of execution of a device according to the invention is diagrammatically illustrated by way of example.

Fig. 2 is a circuit diagram of the system disclosed.

According to the drawing, an elevator-braking machine BM with elevator driving motor AM, a winch W, a holding brake H and a tachometer dynamo T are provided. The rotor R of the braking machine is constructed with squirrel-cage or double-slot armature. Further, it is shown diagrammatically that the reference voltage supplied by an appliance S and the voltage of a tachometer dynamo are led to an amplifier V, which supplies current $i$ to the braking machine BM.

At the beginning of the stopping period, the rotor winding of the driving motor AM has at first such a large resistance connected in series with it, that the motor can still furnish the requisite torque at a low travelling speed. At the same time, the appliance S, which contains a capacitor and a resistance, is separated with the exception of the capacitor from the tachometer dynamo, and the capacitor is connected to an amplifier in such a way that the voltage of the dynamo T is compared with the voltage of the capacitor. If the voltage of the dynamo T is greater than the voltage at the capacitor, the amplifier V delivers current $i$ into the field winding of the braking machine BM, and thus the elevator is retarded until the voltage at the tachometer dynamo T is again as high as that at the capacitor. When the capacitor has discharged to a certain minimum figure, this voltage is maintained by special means until the elevator has reached the floor level. At that moment the motor AM is switched off and the capacitor on the appliance S is completely discharged, whereby the tachometer dynamo supplies such a strong current $i$ into the braking machine BM through the amplifier V that the elevator comes to rest. As soon as the elevator is at a standstill, the holding brake is also applied.

According to Fig. 2, the appliance S has a potentiometer 1, 2, which is connected to the terminals 3, 4 of a source of direct current, a pentode 5, a resistance 6 and a capacitor 7. Further, a two-way switch 8 is provided for connecting the capacitor 7 to the voltage divider 1 or to the anode circuit of the pentode 5 as may be desired. Another two-way switch 9 allows the capacitor 7 to be switched out of the anode circuit of the pentode 5 and connected to the resistance 6.

The amplifier V according to Fig. 2 has the pentode 10 for controlling the known amplifying arrangement with thyratron tubes 11, which are fed through the main transformer 12 and the rectifier 13.

When starting a retarding of the elevator, the two-way switch 8 is first set so that the capacitor is switched into the anode circuit of the pentode 5.

The capacitor 7 then discharges at a rate which is determined by a series resistance 14.

The pentode 10 then controls the thyratron tubes in such a way that a corresponding current $i$ flows in the braking machine BM and the elevator is retarded. When the stopping place of the elevator is reached, the two-way switch is set so that the capacitor 7 discharges completely through the resistance. The elevator is then slowed down till it stops and the holding brake H comes into action.

The series resistance 14 of the pentode 5 determines the manner of retarding the elevator, in that the discharging curve of the capacitor 7 is fixed by this series resistance 14.

But this discharging curve may also be determined by one of the settings of the appliance S, which are illustrated in Figs. 3 to 6.

Whilst in the arrangement according to Fig. 2 the control grid voltage of the pentode 5 is also determined by the current through the resistance, according to Fig. 3 the control grid of the pentode 5 is connected to a special source of direct current lying at the terminals 15 and thus remains fixed.

Figure 4:
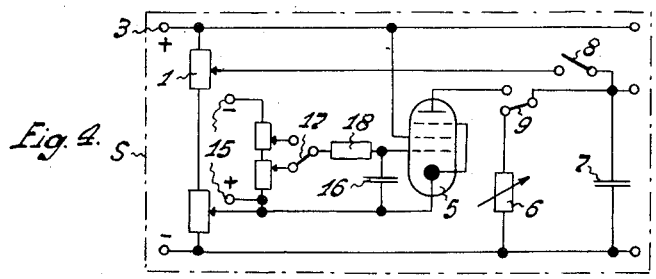

According to Fig. 4, a capacitor 16 is arranged between the control grid and the cathode of the pentode 5. A two-way switch 17, which is reversed during the retarding of the elevator, allows the capacitor 16 to be changed over, through the resistance 18, from a negative value of a definite magnitude to a less strong negative value.

Figure 5:
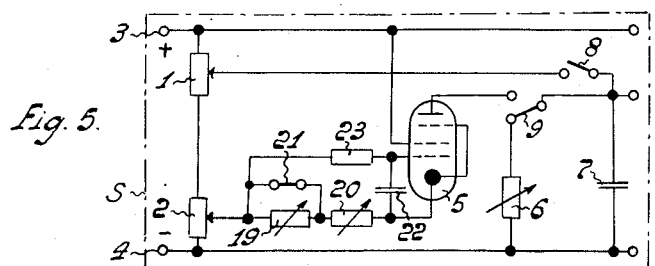

As shown in Fig. 5, two resistances 19 and 20 are connected in series to the cathode of pentode 5. A switch 21 allows resistance 19 to be short-circuited during the retarding of the elevator. Between control grid and cathode of the pentode 5, a capacitor 22 is arranged. Finally, the resistance 23 is also provided, lying between the cathode of the pentode 5 and the voltage-divider 2.

Figure 6:
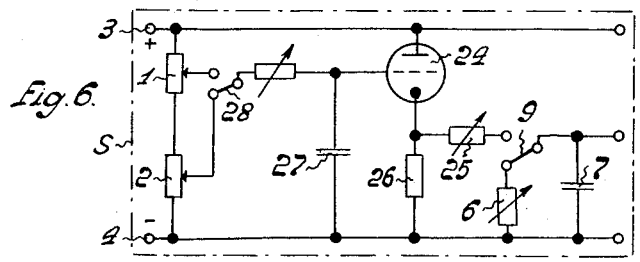

The arrangement according to Fig. 6 differs from those according to Figs. 2 to 5 in so far that a triode is provided instead of a pentode. Also this arrangement serves, like those described, for determining the discharge curve of the capacitor 7. According to Fig. 6, the capacitor 7 is connected through a resistance 25 to the cathode of the triode 24. The anode of the triode is connected to the positive terminal of a source of direct current, and the cathode is connected to the corresponding negative terminal through a resistance 26. A capacitor 27 is situated between control grid of the triode and the negative terminal. When the elevator is being retarded, a two-way switch 28 is set in such a way that the capacitor 27 is discharged.

Having now particularly described and ascertained the nature of my said invention and in what manner the same is to be performed, I declare that what I claim is:

1. In an elevator system having an elevator car for serving a plurality of floors in a building structure; the combination of motive means for moving the elevator car relative to the structure for serving the floors, said motive means comprising a hoisting motor, a dynamo-electric brake and a tachometer dynamo; electrical means for producing a variable magnetic field governing said dynamo-electric brake, said electrical means including a reference voltage appliance which comprises a pentode and a capacitor, said capacitor being charged to a predetermined value while the elevator is traveling at full speed and discharged through said pentode during retarding of the elevator speed; an amplifier device electrically connected to said tachometer-dynamo and to said reference voltage appliance and producing a current which depends on the difference between the voltages of said tachometer dynamo and said reference voltage; an electrical connection between said amplifier device and said dynamo-electric brake for governing the latter by said variable magnetic field determined by said current from said amplifier device.

2. In an elevator system, the combination as in claim 1 wherein a resistance is provided from which the control grid voltage of the pentode is tapped, said resistance being in series with said pentode and connected to the cathode.

3. In an elevator system having an elevator car for serving a plurality of floors in a building structure; the combination of motive means for moving the elevator car relative to the structure for serving the floors, said motive means comprising a hoisting motor, a dynamo-electric brake and a tachometer dynamo; electrical means for producing a variable magnetic field governing said dynamo-electric brake, said electrical means including a reference voltage appliance which comprises a pentode and a capacitor, said pentode having a control grid connected to a potentiometer to which a fixed voltage is applied, said capacitor being charged to a definite value while the elevator is traveling at full speed and discharged through said pentode during retarding of the elevator speed; an amplifier device electrically connected to said tachometer-dynamo and to said reference voltage appliance for producing a current which depends on the difference between the voltages of said tachometer-dynamo and said reference voltage; and an electrical connection between said amplifier device and said dynamo-electric brake governing the latter by said variable magnetic field determined by said current from the amplifier device.

4. In an elevator system having an elevator car for serving a plurality of floors in a building structure; the combination of motive means for moving the elevator car relative to the structure for serving the floors, said motive means comprising a hoisting motor, a dynamo-electric brake and a tachometer dynamo, electrical means for producing a variable magnetic field governing said dynamo-electric brake, said electrical means including a reference voltage appliance which comprises a pentode and a first capacitor, said pentode having a control grid and a cathode, a second capacitor connected to said control grid, siad second capacitor being arranged between said control grid and the cathode of said pentode, a two way switch connected between said second capacitor and a first and a second potentiometer to which a fixed voltage is applied and operative, at the beginning of the retarding of the speed of the elevator car, to bring said second capacitor from a predetermined negative voltage to a lesser negative voltage, said first capacitor being charged to a definite value while the elevator is traveling at full speed and discharged through said pentode during retarding of the elevator speed; an amplifier device electrically connected to said tachometer-dynamo and to said reference voltage appliance for producing a current which depends on the difference between the voltages of said tachometer-dynamo and said reference voltage appliance; and an electrical connection between said amplifier device and said dynamo-electric brake for governing said dynamo-electric brake, by said variable magnetic field determined by said current.

5. In an elevator system having a car for serving a plurality of floors in a building structure; the combination of motive means for moving the elevator car relative to the structure for serving the floors, said motive means comprising a hoisting motor, a dynamo-electric brake and a tachometer-dynamo; electrical means for producing a variable magnetic field governing said dynamo-electric brake; said electrical means including a reference voltage appliance which comprises a pentode and a first capacitor, said first capacitor being charged to a definite value while the elevator is traveling at full speed and discharged through said pentode during retarding of the elevator speed, said pentode having a control grid and a cathode, a second capacitor connected to said control grid; said second capacitor being arranged between said control grid and the cathode of said pentode, two resistances in series with said pentode of said reference voltage appliance and connected to the cathode of said pentode, a switch operative to short-circuit one of said resistances during retarding of the elevator speed, said second capacitor being connected to said short-circuiting switch through a third resistance; an amplifier device electrically connected to said tachometer-dynamo and to said reference voltage appliance for producing a current which depends on the difference between the voltages of said tachometer-dynamo and reference voltage appliance; and an electrical connection between said amplifier device and said dynamo-electric brake for governing the latter by said variable magnetic field determined by said current from the amplifier device.

6. In an elevator system having an elevator car for serving a plurality of floors in a building structure; the combination of motive means for moving the elevator car relative to the structure for serving the floors, said motive means comprising a hoisting motor, a dynamo-electric brake and a tachometer-dynamo; electrical means for producing a variable magnetic field governing said dynamo-electric brake, said electrical means including a reference voltage appliance which comprises a triode and a first capacitor and a second capacitor for producing a reference voltage, said reference voltage being determined by the voltage of said first capacitor, said triode having an anode, a cathode and a control grid, a resistance through which said first capacitor is connectable to the cathode of said triode; a voltage source having positive and negative terminals, the anode of said triode being connected to the positive terminal of said voltage source and the cathode of said triode being connected through a resistance with the negative terminal of said voltage source; the control grid of said triode being connected to the second capacitor in order to be charged to a definite value while the elevator is traveling at full speed and being discharged through a resistance during retarding of the elevator speed; an amplifier device electrically connected to said tachometer-dynamo and to said reference voltage appliance for producing a current which depends on the difference between the voltages of said tachometer-dynamo and said reference voltage appliance; an electrical connection between said amplifier device and said dynamo-electric brake for governing the latter by said variable magnetic field determined by said current from the amplifier device.

References Cited in the file of this patent

UNITED STATES PATENTS

| | | |
|---|---|---|
| 2,620,898 | Lund | Dec. 9, 1952 |
| 2,643,741 | Esselman | June 30, 1953 |